(12) United States Patent
Bartho et al.

(10) Patent No.: US 10,247,636 B2
(45) Date of Patent: Apr. 2, 2019

(54) SHEET METAL PROCESSING MACHINES HAVING A CHIP SUCTIONING DEVICE AND METHODS FOR DETECTING A MALFUNCTION IN THE CHIP SUCTIONING DEVICE

(71) Applicant: TRUMPF Werkzeugmaschinen GmbH + Co. KG, Ditzingen (DE)

(72) Inventors: Frank Bartho, Ludwigsburg (DE); Juergen Appel, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 231 days.

(21) Appl. No.: 14/741,956

(22) Filed: Jun. 17, 2015

(65) Prior Publication Data

US 2015/0362398 A1    Dec. 17, 2015

(30) Foreign Application Priority Data

Jun. 17, 2014   (DE) .................. 10 2014 211 567

(51) Int. Cl.
| | | |
|---|---|---|
| *G01M 3/28* | (2006.01) | |
| *B26D 7/18* | (2006.01) | |
| *B23Q 11/00* | (2006.01) | |
| *B21D 28/02* | (2006.01) | |
| *B21D 45/00* | (2006.01) | |
| *B23Q 17/00* | (2006.01) | |

(52) U.S. Cl.
CPC .......... *G01M 3/2846* (2013.01); *B21D 28/02* (2013.01); *B21D 45/003* (2013.01); *B23Q 11/0046* (2013.01); *B23Q 11/0067* (2013.01); *B23Q 17/007* (2013.01); *B26D 7/1863* (2013.01); *Y10T 83/207* (2015.04)

(58) Field of Classification Search
CPC ... G01M 3/2846; B21D 28/02; B21D 45/003; B23Q 11/0046; B23Q 11/0067; B23Q 17/007; B26D 7/1863; Y02P 70/171; Y10T 83/207
USPC ....................................... 73/40.5 R
See application file for complete search history.

(56) References Cited

U.S. PATENT DOCUMENTS

| | | | |
|---|---|---|---|
| 3,822,622 A | 7/1974 | Smith et al. | |
| 3,880,047 A * | 4/1975 | Dosier ................ | B23Q 3/069 144/252.1 |

(Continued)

FOREIGN PATENT DOCUMENTS

| | | |
|---|---|---|
| DE | 1126706 | 3/1962 |
| DE | 4128933 C2 | 2/1996 |

(Continued)

*Primary Examiner* — Randy Gibson
*Assistant Examiner* — Gedeon M Kidanu
(74) *Attorney, Agent, or Firm* — Fish & Richardson P.C.

(57) ABSTRACT

Sheet metal processing machines having a chip suctioning device and a control device are provided. The chip suctioning device has a chip space connected to a die orifice of a punching die for collecting chips, wherein the chip space is provided with a chip flap and a extraction line, and the extraction line comprises at least one sieve, a vacuum generator, e.g., an extraction fan, connected to the extraction line for generating a vacuum in the chip suction device, and a vacuum sensor, connected to the extraction line between the downstream last sieve and the vacuum generator, being configured to supply signals to the control device.

9 Claims, 2 Drawing Sheets

(56) References Cited

U.S. PATENT DOCUMENTS

| | | | |
|---|---|---|---|
| 5,022,793 A | | 6/1991 | Hoshino et al. |
| 5,214,991 A | | 6/1993 | Shimizu et al. |
| 5,230,793 A | * | 7/1993 | Lenhart .................. B01D 35/12 |
| | | | 184/6.24 |
| 6,003,418 A | | 12/1999 | Bezama et al. |
| 6,036,412 A | * | 3/2000 | Dalla ................. B23Q 11/0046 |
| | | | 408/56 |
| 6,626,166 B1 | * | 9/2003 | Baratta ................ B23D 59/006 |
| | | | 125/12 |
| 7,826,031 B2 | * | 11/2010 | Hara ................... G03F 7/70341 |
| | | | 355/30 |
| 7,905,260 B2 | * | 3/2011 | Keenan ............. B23Q 11/0046 |
| | | | 144/252.1 |
| 8,281,695 B2 | * | 10/2012 | Saari ...................... B08B 15/04 |
| | | | 451/456 |
| 2008/0295556 A1 | | 12/2008 | Hodgson |
| 2010/0307307 A1 | * | 12/2010 | Butler ................. B23D 59/006 |
| | | | 83/58 |
| 2012/0067109 A1 | * | 3/2012 | Kenney ............... G01M 3/2892 |
| | | | 73/40.5 R |
| 2012/0090640 A1 | * | 4/2012 | Rentschler ......... B01D 46/0067 |
| | | | 134/21 |
| 2013/0189177 A1 | * | 7/2013 | Sato ...................... C01B 33/021 |
| | | | 423/349 |

FOREIGN PATENT DOCUMENTS

| | | |
|---|---|---|
| DE | 102005022238 A1 | 11/2006 |
| GB | 2127957 A | 6/1984 |

\* cited by examiner

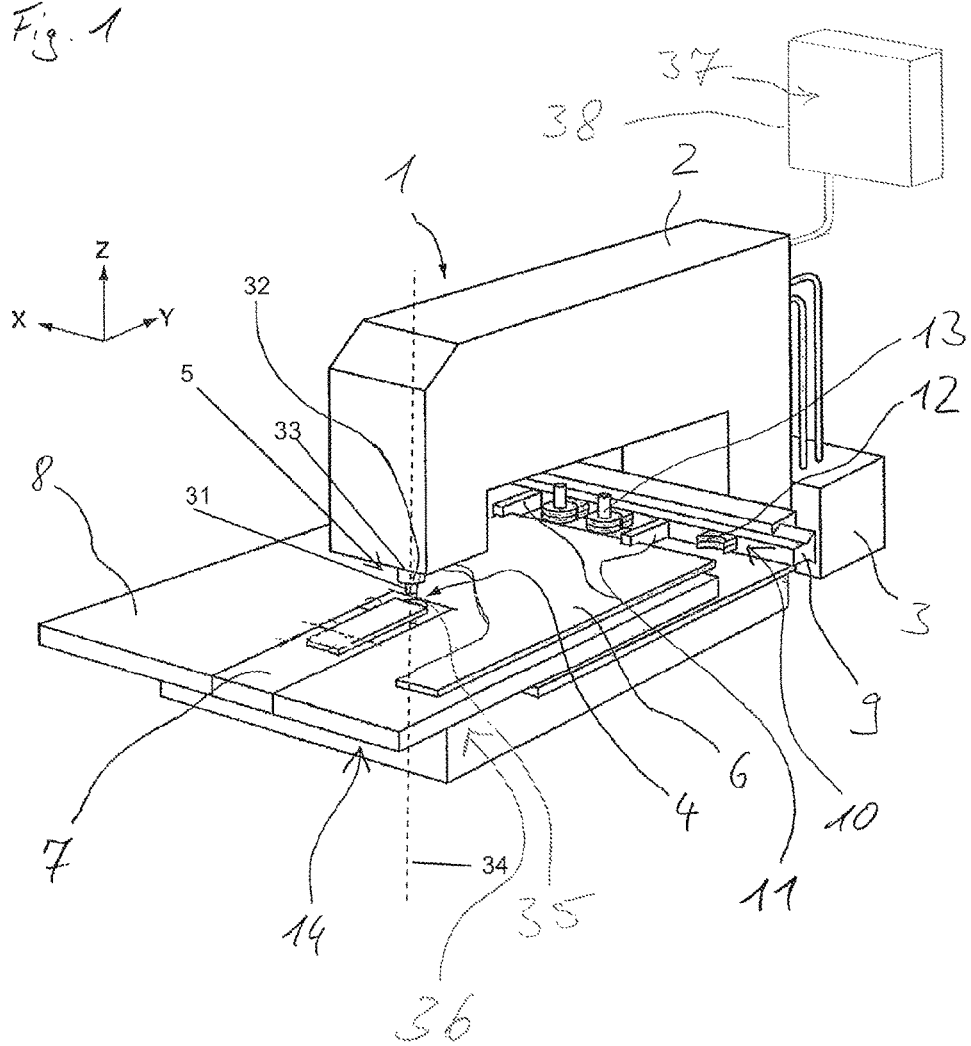

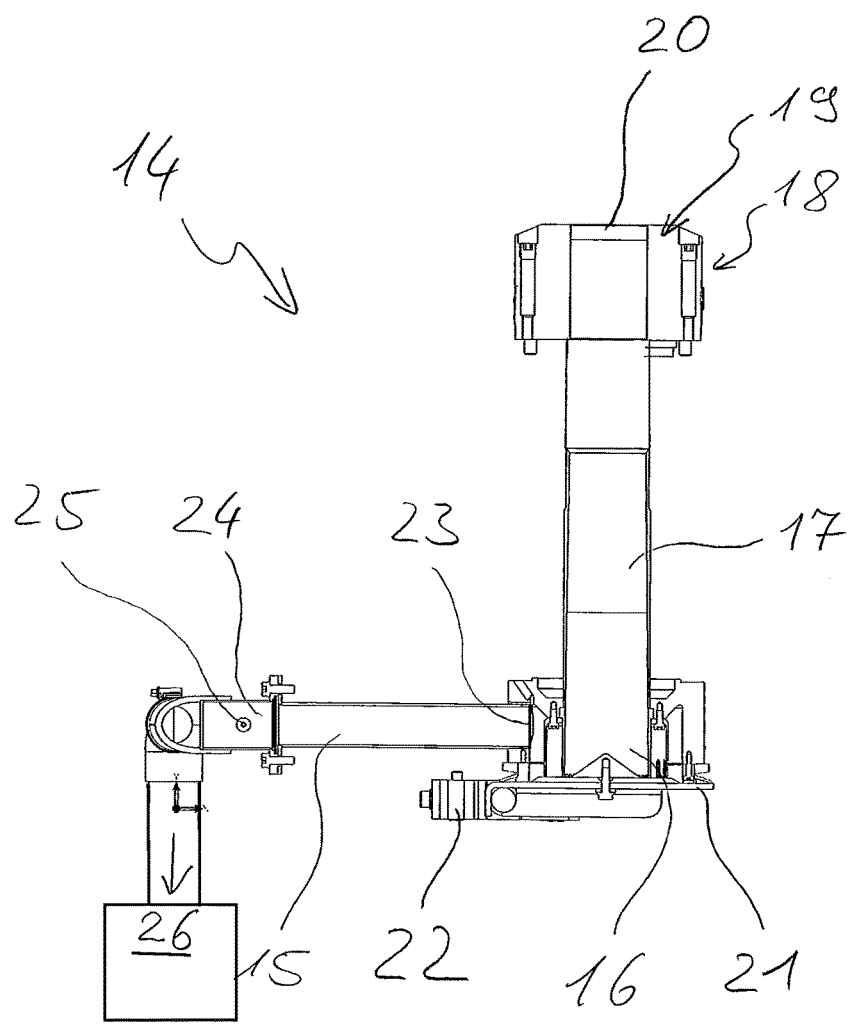

SHEET METAL PROCESSING MACHINES HAVING A CHIP SUCTIONING DEVICE AND METHODS FOR DETECTING A MALFUNCTION IN THE CHIP SUCTIONING DEVICE

CROSS-REFERENCE TO RELATED APPLICATION

This application claims priority from German Application No. DE 10 2014 211 567.1, filed on Jun. 17, 2014. The contents of this priority application are incorporated herein by reference in their entirety.

TECHNICAL FIELD

The present disclosure relates to a sheet metal processing machine having a chip suctioning device.

BACKGROUND

When punching sheet metal on punching machines or combined punching and laser cutting machines the chips and pieces punched or cut from the sheet may be removed, for example via a suctioning system. Removing the chips and pieces punched out helps prevent the pieces from resting on the sheet metal and damaging the sheet metal during a travel movement since collisions or snagging of the remnants with the sheet can happen. Accordingly, chip suctioning devices can be provided in the punching machines or punching and laser cutting machines.

Notwithstanding the implementation of a chip suctioning device the risk of a failure still remains in the machine, in particular failure due to a contamination of sieves in an extraction line (or conduit) of the suctioning device and/or failure due to a leakage of a chip flap of the suctioning device.

In view of the risk of failure associated with contamination of the sieves and leakage of the chip flaps, the sieves are generally frequently purged and physically checked for tightness of the chip suctioning device by means of a separate device when the sheet metal processing machine, e.g., the punching machine or the punching and laser cutting machine, does not work. Since this maintenance procedure is very sophisticated, these measures are generally performed often after collisions or snagging has happened.

SUMMARY

The present disclosure provides sheet metal processing machines having an improved chip suctioning device and related methods that help provide a reliable process and an operator friendly operation of the sheet metal processing machine, e.g., punching, machine.

Particular embodiments provide sheet metal processing machines including a vacuum sensor in an extraction line between a downstream sieve and a vacuum generator, e.g., an extraction fan. Such embodiments provide for the detection of several different sources of disturbance by a single sensor in a simple and efficient manner. For example, various embodiments allow implementation of a sheet metal processing machine without an additional fixing device for the sensor in the chip space, without sophisticated fitting of lines to the sensor, and/or without modification of the housing of the chip space for fixing/supplying the sensor.

In a first aspect, the disclosure provides sheet metal processing machines that include a chip suctioning device and a control device. The chip suctioning device includes an extraction tube connected to a die orifice of a punching die of the sheet metal processing machine. The die orifice is configured to receive chips removed from a metal sheet processed by the sheet metal processing machine. The extraction tube includes a chip flap. The chip suctioning device includes an extraction line coupled to the extraction tube. The extraction line includes at least one sieve. The chip suctioning device includes a vacuum generator (e.g., an extraction fan) coupled to the extraction line. The vacuum generator is configured to generate a vacuum in the chip suctioning device. The chip suctioning device also includes a vacuum sensor connected to the extraction line between a downstream last sieve of the at least one sieve and the vacuum generator. The control device is arranged to communicate with the vacuum sensor to receive a signal from the vacuum sensor corresponding to a vacuum level in the chip suctioning device.

In certain implementations, the chip suctioning device includes at least two sieves, where at least one sieve is formed as a coarse sieve and at least one sieve is formed as a fine sieve.

The control device can be configured to recognize from the signal of the vacuum sensor at least one threshold indicating pollution of the at least one sieve. In certain implementations, the control device is configured to recognize at least two thresholds from the signal of the vacuum sensor, wherein a second of the at least two thresholds indicates critical pollution of the at least one sieve. The control device can also be configured to recognize from the signal of the vacuum sensor a threshold indicating a leaking chip flap, in accordance with particular embodiments.

In certain implementations, the chip flap is provided with a drive device configured to execute a vibrating movement of the chip flap. The control device can be configured to control the vibrating movement when the control device recognizes a threshold indicating a leaking chip flap.

The vacuum sensor is provided with a respective number of switching points for different thresholds, for different implementations. The vacuum sensor may be configured to output pressure signals corresponding to the detected vacuum level, and the control device may be configured to determine whether the pressure signals assume values indicating at least one threshold is exceeded.

In another aspect, the disclosure provides methods for detecting a failure in a chip suctioning device in the sheet metal processing machines described herein. The methods include detecting a vacuum between a vacuum generator and a downstream last sieve, determining by means of the vacuum level by empirically ascertained values whether a failure in the chip suctioning device exists, and signaling the failure of the chip suctioning device in response to a determination that the failure exists in the chip suctioning device.

In certain implementations the methods also include detecting the vacuum level with the chip flap opened to detect a pollution of the at least one sieve. The methods can include detecting the vacuum level with the chip flap closed to detect a leaking chip flap. The methods also include determining a relationship between a vacuum level in the extraction line and the vacuum level in the area of the die orifice and determining a threshold for the vacuum level in the area of the die orifice by the threshold of the vacuum level in the extraction line, in certain implementations. The methods can also include controlling the drive device to execute a vibrating movement of the chip flap in response to a detection of the leaking chip flap.

Various embodiments of the invention are elucidated by reference to the attached drawings.

DESCRIPTION OF DRAWINGS

FIG. 1 is a schematic that shows a punching machine having a chip suctioning device according to an embodiment of the invention.

FIG. 2 is a schematic that shows a side view of the chip suctioning device, in accordance with example embodiments.

DETAILED DESCRIPTION

FIG. 1 shows a punching machine 1 as an embodiment of a sheet metal processing machine. A substantial component of the punching machine 1 is a C-frame 2. In particular embodiments, the C-frame 2 is constructed of steel welded to provide a torsionally stiff frame.

The punching machine 1 includes a hydraulic power unit 3 at the rear end of the C-frame. The hydraulic power unit 3 drives a plunger 5 by a plunger drive (not shown).

The punching machine 1 includes a lower tool holder 4 accommodating a lower tool part 35 of a punching tool 13 at the lower inside of the C-frame 2 in a console space. The lower tool part 35 can rotate 360 degrees about the axis 34 by a rotary drive 36 and can be locked in any selected angular position.

The punching machine 1 includes the plunger 5 at the upper inside of the C-frame 2. The plunger 5 accommodates an upper tool part 32 of the punching tool 31 with an upper tool holder 33 in a form fit and backlash free manner. The plunger 5 can also rotate 360 degrees about an axis 34 and the plunger 5 can be locked in any selected angular position. A second rotary drive (not shown) is provided to rotate the plunger, in accordance with various specific embodiments.

The rotary drives (not shown) are controlled by at least one machine control device 37, which may be provided in a separate electric cabinet 38. Furthermore, in particular embodiments, the at least one machine control device 37 is configured to control a plunger controller and linear drives configured to move a sheet metal 6 and actuators for special functions, e.g., "clapping," a piece flap 7 up and down. A keyboard and a monitor (not shown) can be communicably coupled to the at least one machine control device as input and output devices in accordance with particular embodiments, or these functions can be integrated into the system. As is known in the field, microcontrollers can be implemented with the at least one machine control device to execute the control functions. In addition, the machine control device can include one or more memory storage components for storing standard machining programs and operating parameters used to carry out the functions described herein.

The punching machine 1 includes a machine table 8 comprising a cross rail 9 with a tool magazine 10 arranged at the lower inside of the C-frame 2. Clamping claws 11 configured to retain the sheet metal 6 are arranged at the cross rail 9. The clamping claws 11 can be fixed at suitable locations at the cross rail 9 and can be displaced such that the sheet metal 6 can be safely retained even when the sheet metal 6 is not gripped at an area to be worked. The punching tools 13 are provided in the tool holders 12 of the tool magazine 10. In the illustrated embodiments, the punching machine 1 includes three tool holders 12 and two punching tools 13, but the punching machine 1 may include other numbers of tool holders 12 and punching tools 13, in various embodiments. The piece flap 7 for unloading smaller sheet metal parts is centrally arranged ahead of the lower tool holder 4.

A chip suctioning device 14 according to an embodiment of the invention is provided below the machine table 8 in the C-frame 2.

The machine table 8 is configured to move together with the cross rail 9 in a Y direction. The cross rail 9 is configured to slide in the X-direction with respect to the machine table 8. The clamping claws 11 are coupled to the cross rail 9 and retain the sheet metal 6 in a Y-direction at a programmed position. The cross rail 9 moves in an X-direction to a programmed position to slide the sheet metal 6 over the machine table 8. Once properly positioned, a punching stroke is executed by the plunger 5. The sheet metal is moved again in the X-direction via the cross rail 9 and the clamps 11 are re-positioned and another punch stroke is executed to punch the sheet at another position.

FIG. 2 shows a side view of an embodiment of the chip suctioning device 14 in the punching machine 1. The chip suctioning device 14 is positioned below the machine table 8 and is thus not actually shown in FIG. 1 other than by reference arrow 14. However, the chip suctioning device is described and shown in more detail in FIG. 2, which shows that the chip suctioning device 14 is connected to and positioned under the machine table 8 to receive sheet metal punched out from the sheet 6 by the punching tool 31 and received in the lower tool part 35, which includes die 19, through an orifice 20 in the die 19.

The chip suctioning device 14 is provided with a vacuum generator, e.g., an extraction fan, 26. In some embodiments, the extraction fan 26 is designed to generate a vacuum of at least 300 mbar. The vacuum generator, e.g., extraction fan, 26 is connected to a chip space 16 via an extraction line or conduit 15. An extraction tube 17 is provided extending upwards from the chip space 16. At its upper end, the extraction tube 17 is connected to a console 18. The lower tool holder 4 (FIG. 1) and a punching die 19 are arranged in the console 18. The punching die 19 comprises a die orifice 20 being connected to the chip space 16 via the extraction tube 17.

The chip space 16 comprises a chip flap 21 through which the chips can be brought out of the chip space 16. Drive device 22 opens and closes the chip flap 21. In particular embodiments, the drive device 22 is connected to the control device. In various embodiments, the drive device 22 is configured to cause the chip flap 21 to execute a vibrating movement. The chip flap 21, when opened, permits the sheet metal chips received in the orifice 20 and through the extraction tube 17 to enter the sieve retaining extraction line 15 discussed further herein. The chip flap is positioned in the chip suctioning device 14, below the machine table 8, in contrast to the piece flap 7 positioned on, or as part of, the machine table 8.

A sieve 23 is arranged in the extraction line 15. The sieve 23 can be arranged at the connection of the extraction line 15 to the chip space 16, e.g., as in the illustrated embodiment. In various embodiments, the sieve 23 can also be arranged at another location in the extraction line 15. In specific embodiments, the extraction line 15 includes a second sieve 24. In particular embodiments, the sieve 23 at the terminal is a coarse sieve compared to sieve 24, which is a finer sieve located downstream of sieve 23 in a direction toward the extraction fan 26.

A vacuum sensor 25 is arranged at the extraction line 15, in accordance with particular embodiments. The vacuum sensor 25 is arranged between the extraction fan 26 and the downstream last sieve 24. Placing the vacuum sensor 25 downstream of the sieve 24 permits sensor 25 to detect a pressure drop across all of the sieves and, therefore, a plugging of any or all employed sieves.

In particular embodiments, the vacuum sensor 25 is connected to the extraction line 15 via an auxiliary tube or hose rather than being positioned directly at or in the extraction line 15. In particular embodiments, the vacuum sensor is located within the extraction line 15.

The vacuum sensor 25 supplies an output signal including, but not limited to, a signal indicating a vacuum pressure and/or a change in a vacuum pressure to the control device. The vacuum sensor 25 comprises at least one switching point where the output signal changes depending on the detected vacuum. The switching point is provided at a vacuum value constituting a threshold value indicating that the sieves are unduly polluted. The control device may prevent further processing of the sheet metal upon a determination that the threshold value has been reached or may simply provide an alarm or indicator to the operator of the status of the sieves. The control device may, for example, generate a failure signal to cause one or more components of the punching machine 1 to stop. A further processing of sheet metals is then stopped by the control device, whereby the failure is signaled. An optional further switching point is at a threshold indicating that the pollution of the sieves is critical. The control device causes a display to be provided to the operator to prompt the operator to purge or exchange the sieves 23, 24. In particular embodiments, the control device may determine a plurality of switching points. For example, a first switching point may cause a warning signal while another switching point representing a greater magnitude of a pressure drop or a lower vacuum may subsequently preclude operation.

In specific embodiments, the vacuum sensor 25 supplies an electric pressure signal corresponding to the detected vacuum to the control device. The pressure signal can be an analog or a digital signal. In particular embodiments, the control device compares the pressure signal to one or more stored threshold values to determine whether one or more of the threshold values has been exceeded.

A further optional threshold in the vacuum sensor 25 or in the control device enables the control device to determine whether the closed chip flap 21 is leaking.

In use, the vacuum sensor 25 detects the vacuum in the extraction line 15 between the downstream last sieve 24 and the extraction fan 26 for recognizing a failure in the chip suctioning device 14.

To be able to determine a vacuum in the console space by the vacuum in the extraction line 15, the vacuum in the extraction line 15 between the downstream last sieve 24 and the extraction fan 26 is allocated to the console space, i.e., in the area of the die orifice 20 empirically by test series. Thus, by detecting the vacuum level in the extraction line 15 between the downstream last sieve 24 and the extraction fan 26, the control device can determine whether a vacuum exists in the console space at a sufficient level for proper functioning of the suctioning device 14.

The chip flap 21 is opened and the extraction fan 26 is activated to detect the pollution of the sieves. Opening the chip flap 21 and activating the extraction fan 26 causes the pressure across the sieves 23 and 24 to drop from environmental or atmospheric pressure. The drop detected can be compared to a threshold drop representing an unclogged state to determine whether there is pollution or any obstruction in the sieves 23 and 24.

In the present embodiment, a vacuum in the extraction line 15 between 0 mbar and −60 mbar indicates that a sufficient exhaust performance at the punching die 19 is available. Through empirical tests, it has been determined that a vacuum of −60 mbar corresponds to a pollution grade of the sieves 23, 24 of 70% in accordance with particular embodiments. Vacuum values between −60 mbar and −150 mbar correspond to a pollution grade of 70% to 90% in particular embodiments. Upon detection of these values, a signal that the sieve or the sieves are to be purged or exchanged is output by the control device. Upon a negative value of more than −150 mbar (i.e., a value smaller than −150 mbar), the manufacturing process cannot be continued and the control device of the punching machine 1 stops the operation since a sufficient exhaust performance is no longer provided in the console and the risk of damage, e.g., by snagging a loose piece, is too high.

In accordance with embodiments directed towards detecting whether the chip flap 21 is leaking in the closed state, first, the chip flap 21 is closed and the die orifice 20 is completely covered, for example, by means of, e.g., a thin sheet metal 6 having a thickness of about 1 mm. Subsequently, the extraction fan 26 is activated and the vacuum is determined by means of the vacuum sensor 25 in the extraction line 15. A value of −150 mbar has been empirically determined as a threshold indicating a leaking chip suction device 14, in accordance with particular embodiments. An undercut of this value (a value being between 0 mbar and −150 mbar) indicates that the manufacturing operation cannot be continued and the control device stops the operation, because otherwise the risk of damage, e.g., by snagging is too high.

In particular embodiments, the drive device 22 of the chip flap 21 is controlled such that a vibrating movement is executed in response to an indication that the chip suctioning device is leaking to enable the removal of chips or pieces punched out so that the flap can close tightly again.

Other Embodiments

The several options and embodiments described herein can be combined to provide further embodiments.

What is claimed is:

1. A sheet metal processing machine comprising:
a chip suctioning device comprising:
an extraction tube connected to a die orifice of a punching die of the sheet metal processing machine, wherein the die orifice is configured to receive chips removed from a metal sheet processed by the sheet metal processing machine, and wherein the extraction tube includes a chip flap positioned at a bottom of the extraction tube, the chip flap comprising a drive device configured to close and open the chip flap for bringing out the received chips from the extraction tube,
an extraction line coupled to the extraction tube, wherein the extraction line comprises at least one sieve,
a vacuum generator coupled to the extraction line, wherein the vacuum generator is configured to generate a vacuum in the chip suctioning device, and
a vacuum sensor connected to the extraction line between a downstream last sieve of the at least one sieve and the vacuum generator, wherein the vacuum sensor detects a vacuum in the extraction line between the downstream last sieve and the vacuum generator; and a control device in communication with the vacuum sensor to receive a signal from the vacuum sensor corresponding to a vacuum level in the chip suctioning device.

2. The sheet metal processing machine according to claim 1, wherein the chip suctioning device comprises at least two sieves, wherein at least one sieve is formed as a coarse sieve and at least one sieve is formed as a fine sieve.

3. The sheet metal processing machine according to claim 1, wherein the vacuum generator comprises an extraction fan.

4. The sheet metal processing machine according to claim 1, wherein the control device is configured to recognize from the signal of the vacuum sensor at least one threshold indicating pollution of the at least one sieve.

5. The sheet metal processing machine according to claim 4, wherein the control device is configured to recognize at least two thresholds from the signal of the vacuum sensor, wherein a second of the at least two thresholds indicates critical pollution of the at least one sieve.

6. The sheet metal processing machine according to claim 4, wherein the control device is configured to recognize from the signal of the vacuum sensor a threshold indicating a leaking chip flap.

7. The sheet metal processing machine according to claim 6, wherein the chip flap is provided with a drive device configured to actuate the chip flap between an open and closed position to vibrate the chip flap in response to the control device detecting a leak in the chip flap based on the signal from the vacuum sensor.

8. The sheet metal processing machine according to claim 4, wherein the vacuum sensor is provided with a respective number of switching points for the thresholds.

9. The sheet metal processing machine according to claim 4, wherein the vacuum sensor is configured to output pressure signals corresponding to the detected vacuum level, and the control device is configured to determine whether the pressure signals assume values indicating at least one threshold is exceeded.

* * * * *